US008583770B2

(12) United States Patent
van Riel (10) Patent No.: US 8,583,770 B2
(45) Date of Patent: Nov. 12, 2013

(54) SYSTEM AND METHOD FOR CREATING AND MANAGING VIRTUAL SERVICES

(75) Inventor: Henri H. van Riel, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 1765 days.

(21) Appl. No.: 11/058,224

(22) Filed: Feb. 16, 2005

(65) Prior Publication Data

US 2006/0184653 A1 Aug. 17, 2006

(51) Int. Cl.
*G06F 15/177* (2006.01)

(52) U.S. Cl.
USPC ............................ 709/222; 709/219; 709/227

(58) Field of Classification Search
USPC ........................... 709/201, 203, 220, 221, 222
See application file for complete search history.

(56) References Cited

U.S. PATENT DOCUMENTS

| | | | |
|---|---|---|---|
| 5,553,239 | A | 9/1996 | Heath et al. |
| 5,828,876 | A | 10/1998 | Fish et al. |
| 7,080,373 | B2 * | 7/2006 | Plaxton et al. ................... 718/1 |
| 7,080,378 | B1 * | 7/2006 | Noland et al. ................. 718/104 |
| 7,293,134 | B1 * | 11/2007 | Noland et al. ................. 711/111 |
| 7,448,079 | B2 * | 11/2008 | Tremain ........................... 726/14 |
| 2002/0069369 | A1 * | 6/2002 | Tremain .......................... 713/201 |
| 2002/0103889 | A1 * | 8/2002 | Markson et al. ............... 709/223 |
| 2003/0018927 | A1 * | 1/2003 | Gadir et al. ........................ 714/4 |
| 2003/0133449 | A1 * | 7/2003 | Fitzpatrick et al. ............ 370/389 |
| 2003/0191838 | A1 * | 10/2003 | Tsao ............................... 709/225 |
| 2003/0217131 | A1 * | 11/2003 | Hodge et al. ................... 709/223 |
| 2004/0153639 | A1 * | 8/2004 | Cherian et al. ..................... 713/2 |
| 2006/0059188 | A1 * | 3/2006 | Shirogane et al. ............. 707/102 |
| 2006/0155674 | A1 * | 7/2006 | Traut et al. ......................... 707/2 |

FOREIGN PATENT DOCUMENTS

| | | |
|---|---|---|
| WO | WO-02/03220 | 1/2002 |
| WO | WO-03/088002 | 10/2003 |
| WO | WO 03107178 A2 * | 12/2003 |

OTHER PUBLICATIONS

Adams, Steve. Oct. 1999. *Oracle8i Internal Services: for Waits, Latches, Locks, and Memory.* O'Reilly & Associates, Inc. Sebastopool, California.
Shah, Jay. 1991. "VAXclusters and Other High-Availability Systems." *VAXclusters: Architecture, Programming and Management.* McGraw-Hill, Inc. p. 57-99.
Kenah, Lawrence J. et al. 1984. "VAX/VMS Lock Manager." *VAX/VMS Internals and Data Structures.* Digital Press. p. 244-263.
"Method and System for Managing Creation and Modification of VirtualServers", IP.Com Journal, Nov. 1, 2004.
Bain, et al., 2004, "Introducing Microsoft Virtual Server 2005 on IBM Eserver Xseries Servers", Rebrieved from the Internet: URL: http://www.redbooks.ibm.com/redpapers/[dfsred[3912.pdf.

(Continued)

*Primary Examiner* — Dhairya A Patel
(74) *Attorney, Agent, or Firm* — Wilmer Cutler Pickering Hale and Dorr LLP (57) ABSTRACT

A method of creating and managing virtual servers utilizes separate master copies of information such as operating systems, configuration files, and application programs. When a virtual server is created, it loads an appropriate operating system and configuration information. During the boot process, the virtual server is configured to provide a predetermined service. Appropriate application programs are subsequently loaded to support the service configuration. Multiple virtual servers can be created and configured using the master copies of information, thus reducing the amount of customization required by each virtual server. Virtual servers can be easily restarted from failures with minimal loss of data.

41 Claims, 4 Drawing Sheets

(56) References Cited

OTHER PUBLICATIONS

Pratt, et al., 2001, "I Want More Details Please Describe the Architecture", Retrieved from the Internet: URL:http//web.archive.org/web/20010626154803/http://systemimager.org/manual/html;architecture.html.

European Search Report issued for EP 06 25 0586, dated Feb. 28, 2008.

* cited by examiner

SYSTEM AND METHOD FOR CREATING AND MANAGING VIRTUAL SERVICES

BACKGROUND OF THE INVENTION

1. Technical Field

The present invention relates to computer servers and, more particularly, to creation and management of virtual servers.

2. Description of the Related Art

The increasing use and reliance on computers has created a similar increase in administration requirements. In a typical networked environment, such as a corporate local area network (LAN), there are a number of computers that must be regularly configured. In order to maintain costs at a reasonable level, it is common to reduce the number of human system administrators, and configure the computers automatically. This can be done by loading identical configurations on each computer, and causing each computer to boot and load appropriate software from a central server. This is facilitated, in part, by the fact that each computer has a hardware identification allowing it to connect to the network. Thus, when certain changes and/or updates must be made to the computer configurations, most only need to be made to the copies on the central server.

Certain companies, however, maintain very large servers that are capable of accommodating users with different requirements. It is common for such companies to divide a server into partitions that are capable of performing different functions independently. Such partitions are often referred to as virtual servers. Virtual servers are completely transparent to end users, and operate as if they were independent servers. Consider a large physical server, for example, that includes thirty-two processors, and supports various divisions of a company. The most resource intensive divisions are engineering and customer support. There is also heavy reliance on a relational database management system (RDBMS). The server can create four virtual servers for theses divisions, and allocate sixteen processors for normal operations, eight processors for engineering, four processors for customer support, and four processors for the RDBMS. It should be noted that other resources such as memory, disk storage, etc., would also be allocated in order provide fully operational virtual servers.

Each virtual server can be independently reconfigured to accommodate the needs of the company and divisions. For example, if a major design project is underway, resources can be redistributed so that twelve or sixteen processors are allocated to engineering. During tax season, a virtual server can be created for the accounting division. Since these virtual servers are not physical in nature, none of the configuration is done through the hardware. The physical server can be dynamically reconfigured without having to interrupt other partitions and/or rebooting the physical server.

At least one problem associated with virtual servers, however, is that they still require system maintenance. They must be able to load appropriate software, boot, and access the network. This can be further complicated by the fact that a virtual server is not an actual server and, consequently, lacks any unique hardware characteristics by which it can be identified. For example, a personal computer that is connected to the network has a unique media access control (MAC) address associated with it's network interface card. This facilitates identification and/or configuration of the personal computer so that it is capable of retrieving data across the network. Since the virtual server has no hardware identification, it must be configured with some sort of virtual identification and assigned a function before it can be booted. This can sometimes increase the overhead associated with the network.

Another problem associated with virtual servers is that they must be individually reconfigured each time there is a software update and/or virus update. This can require a significant amount of overhead for companies that provide web hosting services and maintain hundreds, or even thousands, of virtual severs. Each time there is a software update, hundreds of virtual servers may need to be reconfigured. Furthermore, the clients who set up these web hosting accounts are not necessarily system administrators, even though they have full administration privileges. These clients can sometimes contribute to additional system failures that require reconfiguring the virtual server.

SUMMARY OF THE INVENTION

The present invention allows for the operation and management of virtual servers with minimal administrative overhead and/or supervision. Master copies of data such as operating systems and configuration files are maintained separately from normal data that is created and/or collected by the virtual servers. This assists in the creation of multiple virtual servers while reducing the level of system administration necessary to maintain the virtual servers.

In accordance with one or more embodiments, a method is provided for configuring a virtual server. The virtual server is initially created and it loads an operating system image. The operating system image can be any conventional operating system such as, for example, Linux, Unix, Windows, MacOS, etc. Next, configuration information for the virtual server is retrieved. The configuration information can include, for example, data sufficient to provide a state (or identity) to the virtual server, as well as appropriate drivers and resource allocation. The virtual server is then configured, for example, using the operating system and configuration information. Application data is then loaded for the virtual server. The application data can, for example, correspond to software that must be executed by the virtual server in order to perform desired functions. The virtual server then begins providing the services for which it has been configured. According to such a method, master copies of different operating systems, configuration files, and programs are separately maintained and accessible by multiple virtual servers. Thus, the need to independently upgrade and maintain each virtual server can be reduced.

In accordance with one or more additional embodiments of the invention, a method is provided for configuring a plurality of virtual servers. Once created, each virtual sever loads one of a plurality of different operating system images. Each virtual server also loads necessary configuration information. Next, the virtual servers are configured, for example, based on the operating system, hardware configuration, network configuration, state identification, etc. Once configured, each virtual server loads application data necessary to perform the configured operations. The virtual servers are then started.

According to one or more specific implementations, data collected by the virtual servers can be backed up (or saved) periodically, for example, on the physical server or other location. This can be done, for example, based on the amount of data collected and/or predetermined time intervals. The collected data can correspond to any new information that is produced, saved, and/or retrieved by the virtual server after operation has commenced. Thus, if a virtual server suffers a system failure, all operating system and program files can be discarded and reloaded from the master copy with no loss of information. The most recent backup can be retrieved in order to restore the virtual server to its most recent state of operation prior to the system failure. This can be done with substantially no intervention. Further embodiments of the invention allow the virtual servers to save all collected data on the physical server, thereby reducing and/or eliminating the need for creating backups.

In accordance with one or more embodiments of the invention, a system is provided for managing virtual servers. A physical server creates one or more virtual servers, and assigns an identity and a network address to each of the virtual servers. An operating system storage portion stores generic images of data corresponding to different operating systems. A configuration storage portion is used for storing configuration information that configures functions to be performed by the virtual servers, and a data storage portion stores program files and information generated by the virtual servers. Once created, each virtual server loads a generic image from the operating system storage portion, and retrieves configuration information from configuration storage portion. The virtual servers then boot the operating system using the configuration information in order to establish a desired state. Next, application data is loaded from the configuration storage portion. The virtual servers can then begin operation according to their designated states.

These, and various features of novelty which characterize the invention, are pointed out with particularity in the appended claims forming a part of this disclosure. For a better understanding of the invention, its operating advantages, and the specific benefits attained by its uses, reference should be had to the accompanying drawings and embodiments of the invention.

DETAILED DESCRIPTION OF THE INVENTION

Figure 1:
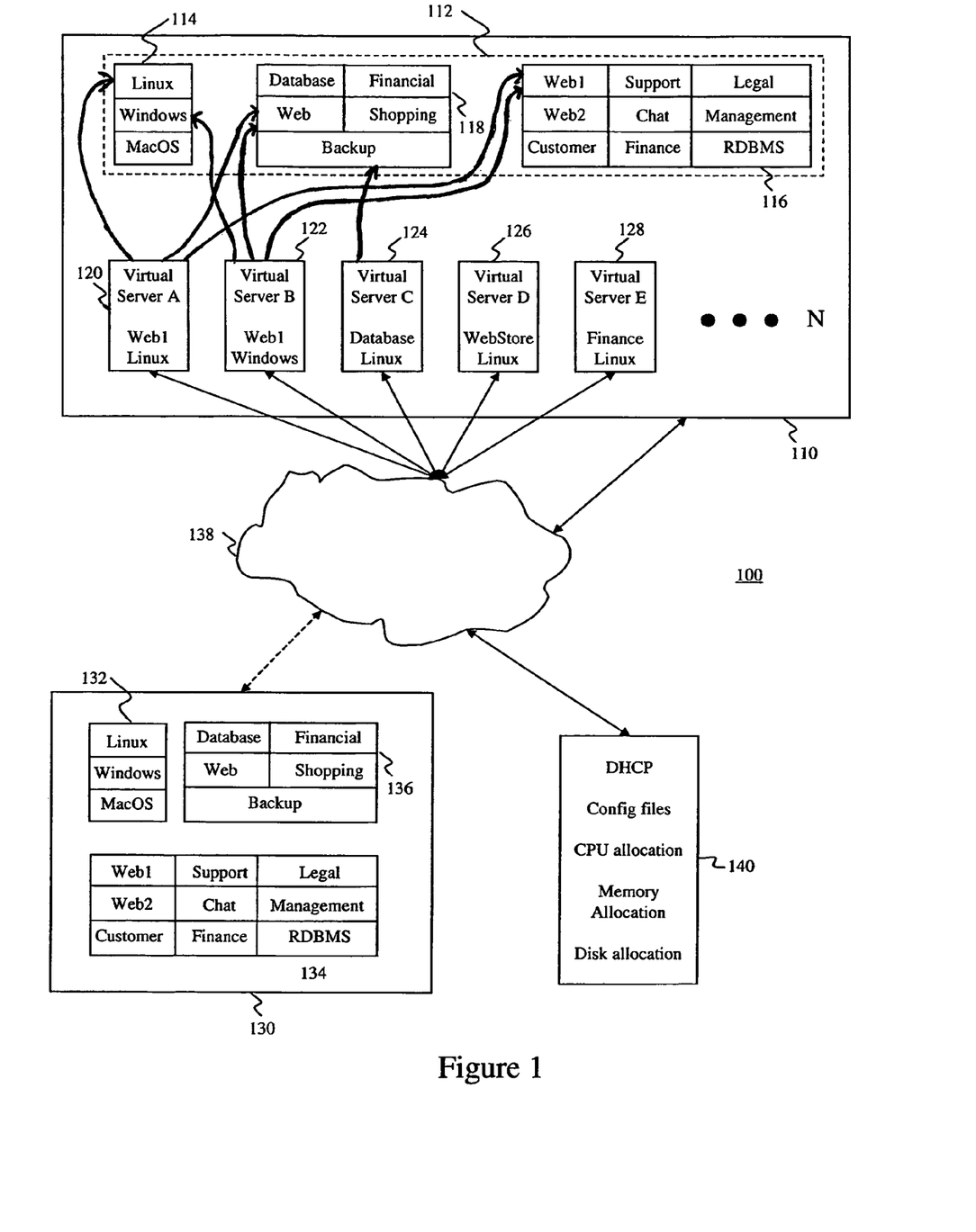
FIG. 1 is a block diagram conceptually illustrating a system for creating and maintaining virtual servers according to one or more embodiments of the present invention.

FIG. 1 illustrates a system 100 for creating and maintaining virtual servers in accordance with one or more embodiments of the present invention. The system 100 includes a physical server 110 that can be used to create and maintain multiple virtual servers 120-128. The physical server 110 includes conventional hardware and software such as, for example, one or more central processing units (CPU), internal memory, as well as various storage devices (none shown). According to one or more embodiments of the present invention, the physical server 110 also includes a storage system 112. The storage system 112 contains information that can be used to configure the virtual servers 120-128. Further, the storage system 112 can be partitioned into one or more distinct storage units. For example, an operating system storage portion 114 can be used to store images of different operating systems. Such operating systems can include, for example, Linux, Unix, Windows, MacOS, etc. Further, there can be various implementations of an operating system such as, for example, Red Hat Linux, Debian Linux, etc. Each operating system would be stored as one image that can be accessed by one or more virtual servers.

The storage system 112 also includes a configuration storage portion 116. The configuration storage portion 116 stores information specific for configuring the virtual servers 120-128 to perform various tasks. For example, the configuration storage portion 116 of the physical server 110 includes information for configuring a web server, a customer support server, a finance server, a chat server, a database server, etc. Such configurations allow a virtual server to be created for a specific function within a particular network or LAN. The storage system 112 can also include a data storage portion 118. The data storage portion 118 can be used, for example, to store specific applications that must be run by the virtual server 110. The data storage portion 118 can also include a data backup partition that allows periodic backups of the virtual servers, for example, in the event of a system failure. The data storage portion 118 can also store all of the data generated by the virtual servers 120-128. This can reduce and/or eliminate the need for backups.

According to one or more embodiments of the present invention, the system 100 can be provided with multiple physical servers 110. Each physical server 110 would also be capable of creating a plurality of virtual servers 120-128. The virtual servers 120-128 created can be configured for the same function for a particular client, as well as the same function for different clients. Furthermore, multiple virtual servers 120-128 can be created to have different functions. For example, as shown in FIG. 1, virtual server 120 is configured as a web 1 server. Virtual server 122 is also configured as a web 1 server. Virtual servers 124, 126, and 128 are configured as database, web store, and finance servers, respectively.

According to one or more embodiments of the present invention, the storage system 112 maintains master copies of all information required by any virtual server that can be created. For example, if virtual servers 120 and 122 are created as web servers running the Linux operating system, each one would access the operating system storage portion 114 and retrieve a copy of the operating system in order to boot and initiate operations. Each of the virtual servers 120-128 would access the identical copy of the operating system image. According to such embodiments, changes and/or updates to the different operating systems would be made to the physical server 110. The updated versions would then be stored as master copies in the operating system storage portion 114. This can significantly reduce the amount of overhead necessary to maintain the virtual servers 120-128 because only the master copy needs to be updated for access by the virtual servers 120-128.

Once the virtual servers 120-128 retrieve the appropriate operating system, they access the configuration storage portion 116 in order to load appropriate application programs (or software applications) and/or information to configure themselves for performing appropriate tasks. For example, if a virtual server 120 is created to function as a web server, then upon loading the appropriate operating system, the virtual server would access the configuration storage portion and retrieve the web configuration applications, and other related information, necessary to function as a web server. The configuration performed by the virtual server 120 can include, for example, assignment of temporary and/or permanent Internet Protocol (IP) addresses, mounting appropriate virtual drive systems and other hardware, allocation of memory, etc., in order to function. The configuration can also include defining and implementing appropriate security protocols to allow users to access the virtual server. According to additional embodiments of the invention, the physical server 110 can create a RAM disk (or other volatile/temporary storage) for storing the configuration information for a newly created virtual server. When the new virtual server loads the operating system image, the contents of the Ram disk (i.e., the stored configuration information) would be simultaneously loaded.

Once the virtual server has been created, appropriate software can be loaded from the data storage portion 118. For example, if a virtual server 120 will function as a web server, then the appropriate web server and firewall applications can be loaded. Similarly, if a virtual server 126 will function as a web store, then the appropriate financial and transactional application programs can be loaded. Once the appropriate application programs have been loaded, the virtual server is ready to begin operating in its designated capacity. According to one or more embodiments, during normal operations, new data that is generated by the virtual servers can also be stored in the backup portion of the data storage portion 118. The newly generated data can be stored, for example, at predetermined time intervals or once a certain quantity of data has accumulated. The time interval for saving the data, or the amount of data required before saving, can be dependent on the particular application and/or specific user needs. For example, if a client generates a large quantity of business transactions, then such backups (or snapshots) can be taken at shorter intervals such as, for example, hourly or less. If a client does not conduct a great quantity of transactions, then it may be sufficient to create a backup within a three or four hour interval. According to further embodiments of the invention, all data generated by the virtual servers 120-128 can be stored in the data storage portion 118. Such embodiments of the invention can reduce and/or eliminate the need for backups. Further, data loss can also be reduced if the virtual server crashes because there would be no significant information stored in the virtual server.

According to one or more embodiments of the present invention, the storage system can be provided as a separate storage server 130 that is distinct, or physically separated, from the physical server 110. The storage server 130 can be in the form of, for example, a data storage warehouse that includes multiple storage units (such as magnetic drives) to store the appropriate information. According to such embodiments, the physical server 110 would create each virtual server 120-128 and assign a specific identity to the virtual servers 120-128. The identity would include the function of the virtual server, the type of operating system that will be used, as well as a temporary and/or permanent network address that can be used in order to access the storage server 130 and load the appropriate information. The virtual servers 120-128 access the information across a network 138 such as, for example, the Internet. Furthermore, any upgrades or changes that need to be made to master copies stored on the storage server 130 can be done by the physical server 110 across the network 138. According to further embodiments of the present invention, a configuration server 140 can also be provided to generate certain hardware profiles for the virtual servers 120-128. The hardware profiles can include, for example, temporary and/or permanent IP addresses (i.e., network addresses), virtual file storage systems, as well as CPU allocation.

According to one or more embodiments of the present invention, the configuration server 140 is capable of detecting the current configuration of each virtual server 120-128. This allows the configuration server 140 to customize configuration information so that only essential files are transferred to the virtual servers 120-128. For example, if the operating system of a virtual server 120-128 must be upgraded, only certain files would be necessary, and not the entire distribution. By detecting the configuration of the virtual server 120-128 in advance, the configuration server 140 is capable of identifying the files necessary for the upgrade and transferring only the necessary files. Similarly, when switching between different implementations of an operating system such as, for example, Red Hat Linux and Debian Linux, the configuration server 140 would identify the current configuration of the virtual sever and transfer only the necessary files. Such embodiments can reduce the amount of time necessary to change and/or upgrade the configuration of the virtual servers 120-128.

According to one or more further embodiments of the present invention, the virtual servers 120-128 use the data storage portion 118 to maintain all new data that is generated during operation. Thus, such embodiments can reduce the need for separate data backups of the virtual servers 120-128, because the new data is stored directly in the data storage portion 118. In the event of a system failure, the effected virtual server can easily be recreated from scratch, because there is no significant data stored within the effected virtual server. Additionally, the risk of data loss between backups can be reduced.

Figure 2:
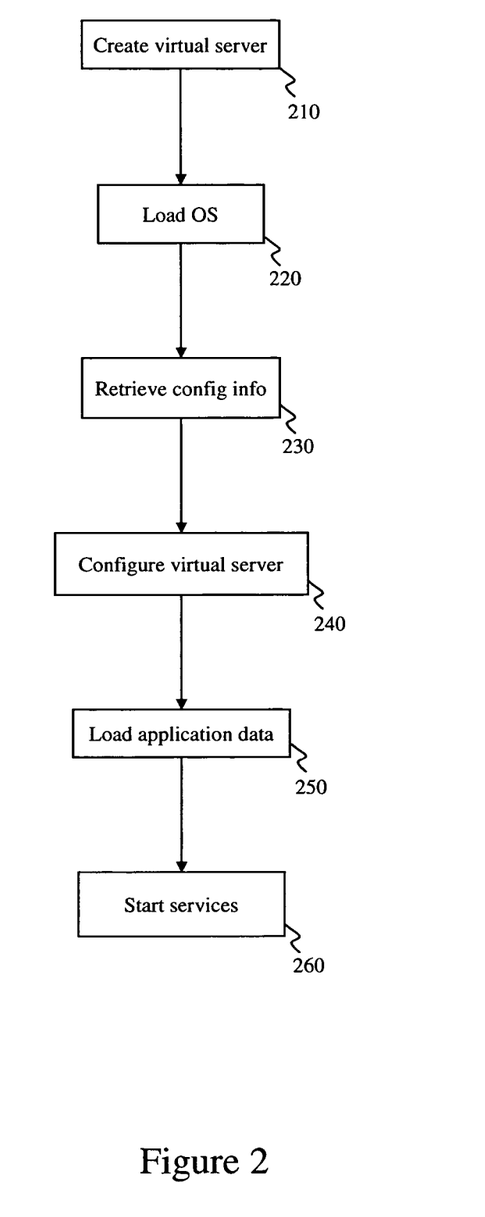
FIG. 2 is a flowchart illustrating steps performed to create a virtual server in accordance with one or more embodiments of the present invention.

FIG. 2 illustrates creation of a virtual server according to one or more embodiments of the present invention. At 210, the physical server creates the virtual server. As part of creating the virtual server, the physical server can execute a script file or command line function. The script and/or command can include parameters necessary to specify the location of files, designate the type of operating system, and define temporary and/or permanent network addresses for the virtual server. The virtual server retrieves an appropriate operating system at 220. Once the operating system is retrieved, configuration information is retrieved at 230. The operating system and the configuration information are retrieved from the storage system, as previously discussed. At 240, the virtual server is configured based on the operating system and the configuration information that has been retrieved. For example, the virtual server can be configured as a web server running the Linux operating system. Various protocols and hardware profiles can also be defined so that the virtual server appears to be a normal physical server. At 250, application data is loaded by the virtual server. The application data can include, for example, software and data files that are necessary in order to implement the designated functions. At 260, the virtual server begins performing designated operations/services.

Figure 3:
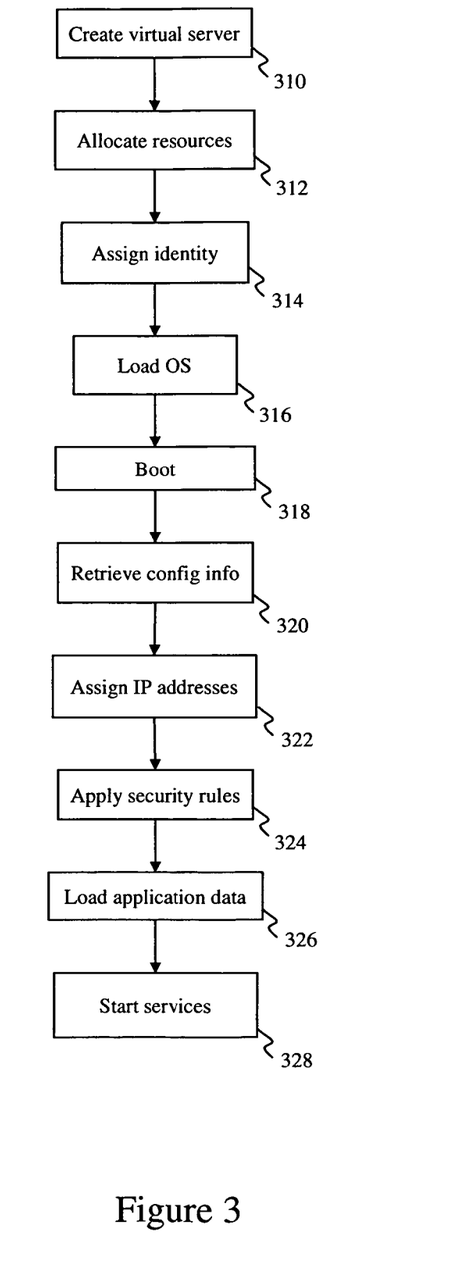
FIG. 3 is a flowchart illustrating steps performed to create virtual servers according to one or more embodiments of the present invention.

FIG. 3 illustrates creation of a virtual server according to one or more embodiments of the present invention. At 310, the virtual server is created. This can be done, for example, by executing a command line statement to create the virtual server. At 312, various resources are allocated to the virtual server. Such resources can include, for example, CPU allocation, file system allocation, memory allocation, etc. At 314, the virtual server is assigned an identity. According to various embodiments of the invention, this identity can correspond to the function that the virtual server will be performing. For example, the virtual server can be created and identified as a web server. According to other embodiments, the identity can also include information regarding the type of operating system that will be used by the virtual server as well as temporary and/or permanent network addresses.

At 316, the virtual server loads the appropriate operating system from the operating system storage portion. At 318, the virtual server boots the operating system. During the boot process, the virtual server also retrieves configuration information at 320. At 322, various temporary and/or permanent IP (or network) addresses are assigned to the virtual server. The temporary and/or permanent IP addresses can be used, for example, to facilitate network communication between other servers and/or users. At 324, appropriate security rules are applied to the virtual server. Such security rules can define, for example, the type of access that users and other servers will have to the virtual server. At 326, appropriate application data is loaded by the virtual server. At 328, the virtual server begins functioning according to its specified designation.

Figure 4:
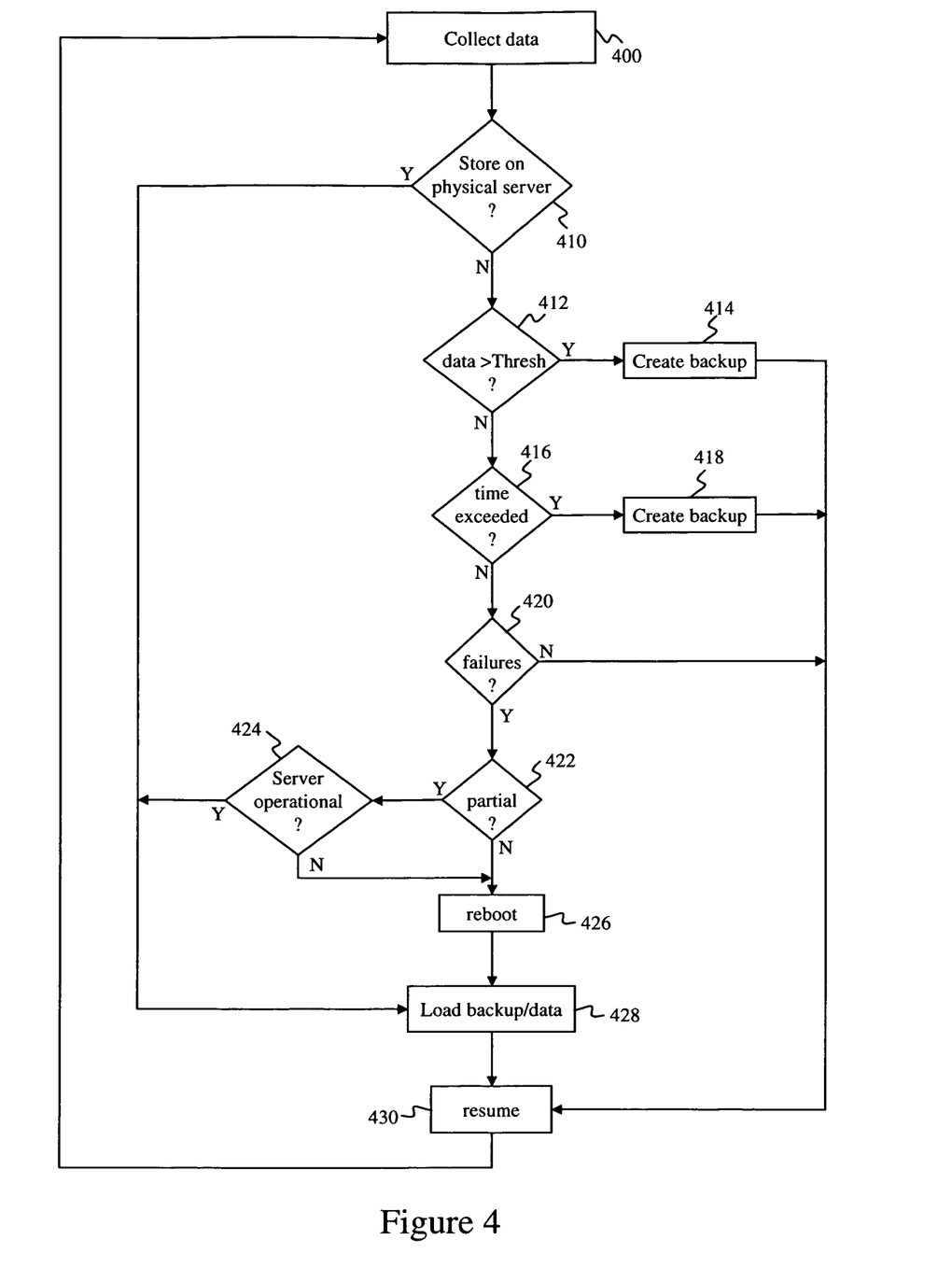
FIG. 4 is a flowchart illustrating steps performed to manage virtual servers according to one or more embodiments of the present invention.

FIG. 4 illustrates management of one or more virtual servers according to various embodiments of the present invention. The process begins at a point where the virtual servers have already been created and configured. All appropriate applications have been loaded and the virtual server is operating as designated. At 400, data generated and/or received by the virtual servers during normal operation is collected. At 410, it is determined whether the virtual servers will store newly generated data on the physical server. For example, all of the new data generated by the virtual servers could be stored on the data storage device so that backups would not be necessary. If the new data will be stored on the physical server, then it is stored and control passes to 428. Alternatively, if data will not be stored on the physical server, then control passes to 412. At 412, it is determined if the collected data exceeds a predetermined threshold. This determination is made for each virtual server that is being managed. As previously discussed, the threshold can correspond to, for example, a predetermined size limit on the amount of data that has been collected. If the collected data exceeds the threshold, then at 414, a snapshot of the data (or backup) is created. Operation of the virtual server then resumes. If the collected data does not exceed the predetermined threshold, then control passes to 416.

It is then determined if the time from the last backup has exceeded a predetermined time limit. If the time limit has been exceeded, then a snapshot (or backup) is created at 418. The operation of the virtual server then resumes and data continues to be collected. However, if the time limit has not been exceeded, then at 420, it is determined if any of the virtual servers have suffered from a failure. If no failures have occurred then operation resumes. If any failures are detected, however, then at 422 it is determined whether the identified server (or servers) has suffered from a partial or complete failure. If the failure is only partial, then at 424 it is determined whether the virtual server is stable enough to continue operation. If the virtual server is stable, then at 428 data from the most recent snapshot (or backup) is loaded and operation of the virtual server resumes. However, if the virtual server is not operating properly or if a complete failure has occurred, then at 426 the virtual server is rebooted. By rebooting the virtual server, the operating system, configuration information, and application software are all reloaded. Once all of the files have been loaded, the most recent snapshot is loaded by the virtual server at 428. Further, if newly generated data was stored on the physical server at 410, then this data would be loaded at 428 instead of the most recent snapshot. At 430, operation of the virtual server resumes. Control then returns to 410 where data from the virtual servers continue to be collected and management of the virtual servers continues.

The foregoing embodiments are provided by way of explanation of the invention, which is not intended to be limited thereto. In fact, those of ordinary skill in the art will appreciate, upon reading the present specification and viewing the present drawings, that various modifications and variations can be made. For example, features illustrated or described as part of one embodiment can be used on other embodiments to yield a still further embodiment. Additionally, certain features may be interchanged with similar devices or features not mentioned yet which perform the same or similar functions. Furthermore, the present invention can be implemented on various computer systems and/or servers using any operating system including, Windows, MacOS, Unix, Linux, etc., and can be applied to any programming language. It is therefore intended that such modifications and variations are included within the totality of the present invention.

The many features and advantages of the invention are apparent from the detailed specification, and thus, the appended claims are intended to cover all such features and advantages which fall within the true spirit and scope of the invention. Further, since numerous modifications and variations will become readily apparent to those skilled in the art, the invention should not be limited to the exact construction and operation illustrated and described. Rather, all suitable modifications and equivalents may be considered as falling within the scope of the claimed invention.

What is claimed is:

1. A method of configuring a virtual server comprising:
   creating the virtual server;
   loading an operating system image from an operating system storage;
   retrieving configuration information for the virtual server from a configuration storage;
   configuring the virtual server;
   loading application data for the configured virtual server from a data storage;
   selectively identifying, by a configuration server, updated information to be transferred to the virtual server, the updated information comprising the operating system image; and
   detecting if a partial failure or a complete failure of the virtual server has occurred, and if the partial failure has occurred, determining whether the virtual server can continue operation, and if a complete failure has occurred, rebooting the virtual server,
   wherein the operating system image, the configuration information and the application data are separately retrieved by the virtual server from the operating system storage, the configuration storage, and the data storage, respectively, such that the virtual server provides a particular functionality based on the configuration information that was retrieved, and
   wherein, before the operating system image, the configuration information and the application data are separately retrieved, a plurality of different operating system images is stored in the operating system storage, information for a plurality of different configurations is stored in the configuration storage, and a plurality of different applications is stored in the data storage.

2. The method of claim 1, wherein creating the virtual server comprises executing at least one command line argument to invoke the virtual server.

3. The method of claim 2, wherein loading an operating system image comprises loading a selected operating system image from a plurality of operating system images based, at least in part, on the at least one command line argument.

4. The method of claim 2, wherein the at least one command line argument includes a network address, and the configuration information is retrieved across a network connection.

5. The method of claim 1, wherein creating the virtual server comprises:
   allocating resources for the virtual server; and
   assigning an identity to the virtual server.

6. The method of claim 5, wherein retrieving configuration information is based, at least in part, on the identity of the virtual server.

7. The method of claim 1, wherein loading an operating system image comprises:
creating a ram disk containing configuration information for the virtual server; and
retrieving the configuration information from the ram disk while loading the operating system image.

8. The method of claim 1, wherein loading an operating system image further comprises booting the virtual server using the operating system.

9. The method of claim 1, wherein configuring the virtual server further comprises:
assigning at least one network address to the virtual server; and
applying security rules for the virtual server.

10. The method of claim 1, further comprising assigning at least one network address to the virtual server.

11. The method of claim 10, wherein the at least one network address is assigned based on at least one security rule.

12. The method of claim 10, wherein the at least one network address is assigned based on at least one command line instruction.

13. The method of claim 10, wherein the at least one network address is assigned based on an identity of the virtual server.

14. The method of claim 1, further comprising periodically saving data generated by the virtual server.

15. The method of claim 14, further comprising:
in response to detecting the complete failure, retrieving the saved data.

16. The method of claim 14, further comprising:
in response to detecting the partial failure, retrieving the saved data and resuming operation of the virtual server using the saved data.

17. The method of claim 1, wherein rebooting the virtual server comprises repeating the steps of loading an operating system image, retrieving configuration information, configuring the virtual server, loading application data, and starting configured services.

18. The method of claim 1, further comprising changing the configuration of the virtual server.

19. The method of claim 18, wherein:
changing the configuration comprises detecting a previous configuration for the virtual server; and
retrieving configuration information comprises retrieving only configuration information necessary to change the configuration of the virtual server.

20. A method of configuring a plurality of virtual servers comprising:
creating the plurality of virtual servers;
loading, by each virtual server, one of a plurality of different operating system images from an operating system storage;
retrieving configuration information for each virtual server from a configuration storage;
configuring each virtual server;
loading application data by each configured virtual server from a data storage;
selectively identifying, by a configuration server, updated information to be transferred to the virtual servers, the updated information comprising the one of the plurality of different operating system images; and
detecting if a partial failure or a complete failure of at least one of the virtual servers has occurred, and if the partial failure has occurred, determining whether the at least one virtual server can continue operation, and if the complete failure has occurred, rebooting the at least one virtual server,
wherein the operating system images, the configuration information and the application data are separately retrieved by the virtual servers from the operating system storage, the configuration storage, and the data storage, respectively, such that the virtual servers provide a particular functionality based on the configuration information that was retrieved, and
wherein, before the operating system images, the configuration information and the application data are separately retrieved, information for a plurality of different configurations is stored in the configuration storage, and a plurality of different applications is stored in the data storage.

21. The method of claim 20, wherein creating the plurality of virtual servers comprises:
allocating resources for each virtual server; and
assigning an identity to each virtual server.

22. The method of claim 21, wherein retrieving configuration information is based, at least in part, on the identity of each virtual server.

23. The method of claim 20, wherein loading an operating system image further comprises booting the virtual server using the operating system.

24. The method of claim 20, wherein configuring each virtual server further comprises:
assigning at least one network address to each virtual server; and
applying security rules for each virtual server.

25. The method of claim 20, further comprising assigning at least one network address to each virtual server.

26. The method of claim 25, wherein the at least one network address is assigned based on at least one security rule.

27. The method of claim 25, wherein the at least one network address is assigned based on at least one command line instruction.

28. The method of claim 25, wherein the at least one network address is assigned based on an identity of each virtual server.

29. The method of claim 20, further comprising periodically saving data for each virtual server.

30. The method of claim 29, further comprising:
in response to detecting the complete failure, retrieving the saved data for the at least one virtual server affected by the complete failure.

31. The method of claim 29, further comprising:
in response to detecting the partial failure, retrieving the saved data for the at least one virtual server affected by the partial failure, and resuming operation of the failed at least one virtual server using the saved data.

32. The method of claim 20, further comprising changing the configuration of at least one virtual server.

33. The method of claim 32, wherein:
changing the configuration comprises detecting a previous configuration for the at least one virtual server; and
retrieving configuration information comprises retrieving only configuration information necessary to change the configuration of the at least one virtual server.

34. A system for managing virtual servers comprising:
a physical server including at least one central processing unit, the physical server creating one or more virtual servers, and assigning an identity and a network address to each of said one or more virtual servers;

the physical server detecting if a partial failure or a complete failure of at least one of the one or more virtual servers has occurred, and if the partial failure has occurred, determining whether the at least one of the one or more virtual servers can continue operation, and if a complete failure has occurred, rebooting the at least one of the one or more virtual servers, a storage system, including an operating system storage portion, a configuration portion, and a data storage portion, the operating system storage portion storing generic images of data defining operating system environments, wherein each image corresponds to a different operating system;

the configuration storage portion storing configuration information specifying functions to be performed by said one or more virtual servers;

the data storage portion storing information generated by said one or more virtual servers; and a configuration server that selectively identifies updated information to be transferred to said one or more virtual servers, the updated information comprising at least one of the images;

wherein each said virtual server performs the acts:
    loading a generic image from said operating system storage portion,
    retrieving configuration information from said configuration storage portion,
    booting the operating system using said configuration information, and
    loading application data from said configuration storage portion,
    wherein the generic image, the configuration information and the application data are separately retrieved by the virtual server from the operating system storage portion, the configuration storage portion, and the data storage portion, respectively, such that the virtual server provides a particular functionality based on the configuration information that was retrieved, and
    wherein, before the generic image, the configuration information and the application data are separately retrieved, a plurality of different generic images is stored in the operating system storage portion, information for a plurality of different configurations is stored in the configuration storage portion, and a plurality of different applications is stored in the data storage portion.

35. The system of claim 34, wherein said at least one physical server allocates resources for each of said one or more virtual servers.

36. The system of claim 34, wherein each virtual server applies security rules based, at least in part, on said configuration information and said identity.

37. The system of claim 34, wherein said data storage portion includes a backup portion for periodically storing collected data from said one or more virtual servers.

38. The system of claim 34, wherein said physical server
    in response to detecting the complete failure, performs the acts of:
    creating a new virtual server with the identity and network address of each failed virtual server,
    booting said new virtual server with the properties of said failed virtual server, and
    loading saved application data from said data storage portion to said new virtual server.

39. The system of claim 34, wherein said physical server
    in response to detecting the partial failure, causes said at least one failed virtual server to retrieve saved application data from said data storage portion and resume operation.

40. The system of claim 34, wherein the configuration of at least one virtual server is changed.

41. The system of claim 40, wherein:
    said configuration storage portion detects a previous configuration for said at least one virtual server; and
    retrieving configuration information comprises retrieving only configuration information necessary to change the configuration of said at least one virtual server.

* * * * *